United States Patent [19]
Steelman

[11] Patent Number: 5,843,336
[45] Date of Patent: Dec. 1, 1998

[54] SILICATE DEFOAMING COMPOSITION AND METHODS

[75] Inventor: Alvin E. Steelman, Havre de Grace, Md.

[73] Assignee: J.M. Huber Corporation, Edison, N.J.

[21] Appl. No.: 686,625

[22] Filed: Jul. 24, 1996

Related U.S. Application Data

[62] Division of Ser. No. 354,020, Dec. 6, 1994, Pat. No. 5,575,950.

[51] Int. Cl.$^6$ .................................................. B01D 19/02
[52] U.S. Cl. ........................... 252/321; 252/358; 162/72; 162/158; 162/164.4; 162/173
[58] Field of Search .................................... 252/321, 358; 162/72, 158, 164.4, 173, 181.6

[56] References Cited

U.S. PATENT DOCUMENTS

| | | | |
|---|---|---|---|
| Re. 30,568 | 4/1981 | Fitton | 106/467 |
| 2,848,346 | 8/1958 | Bertorelli | 106/483 |
| 2,892,797 | 6/1959 | Alexander et al. | 252/313.2 |
| 3,149,024 | 9/1964 | Behn et al. | 162/181.6 |
| 3,408,306 | 10/1968 | Boylan | 252/321 |
| 3,573,222 | 3/1971 | Harrison, Jr. et al. | 252/321 |
| 3,798,046 | 3/1974 | Fitton | 106/467 |
| 3,909,286 | 9/1975 | Fitton | 106/467 |
| 3,915,734 | 10/1975 | Fitton | 106/467 |
| 3,993,497 | 11/1976 | Wason | 106/483 |
| 4,008,173 | 2/1977 | Davis | 252/358 |
| 4,036,663 | 7/1977 | Williams et al. | 106/483 |
| 4,038,098 | 7/1977 | Wason | 106/483 |
| 4,208,301 | 6/1980 | Gammon | 252/321 |
| 4,224,295 | 9/1980 | Brandt et al. | 423/335 |
| 4,303,549 | 12/1981 | Boylan | 252/321 |
| 4,340,500 | 7/1982 | Boylan | 252/321 |
| 4,438,012 | 3/1984 | Kühling et al. | 252/358 |
| 4,443,357 | 4/1984 | Maloney et al. | 252/321 |
| 4,477,370 | 10/1984 | Kavchok et al. | 252/321 |
| 4,626,377 | 12/1986 | Kavchok et al. | 252/321 |
| 4,863,796 | 9/1989 | Wason | 252/358 |
| 5,168,082 | 12/1992 | Matchett et al. | 252/313.2 |
| 5,575,950 | 11/1996 | Steelman | 252/321 |

FOREIGN PATENT DOCUMENTS

| 0 147 470 | 4/1981 | Germany | 252/321 |
|---|---|---|---|

OTHER PUBLICATIONS

"New Water–Based Defoamers Offer Improved Performance as Well as Environmental Advantages," J.H. Wamsley et al., Pulp & Paper, Canada 95:5, 1994, Month unavailable pp. 47–50.

"Influence of Silica Properties on Performance of Antifoams in Pulp and Paper Applications 2. In S–ITU Hydrophobing," Robert Patterson, Colloids and Surfaces A: Physiochemical and Engineering Aspects, vol. 74, 1993, Month unavailable pp. 115–126.

"Defoamers," Kirk–Othmer, Encyclopedia of Chemical Technology, vol. 7, Third Edition, pp. 430–438, (1979) Month unavailable.

*Primary Examiner*—Richard D. Lovering
*Assistant Examiner*—Daniel S. Metzmaier

[57] ABSTRACT

Defoaming formulations for aqueous systems are produced by treating silicates such as sodium magnesium aluminosilicates with a source of aluminum to provide an aluminum content therein in the range of 0.1 to 2.5 wt. %, preferable 0.3 to 1.2 wt. %, and forming a defoaming formulation from said aluminum treated silicate by hydrophobizing with a silicone fluid, and dispersing in oil and/or water to form a defoamer formulation.

9 Claims, 2 Drawing Sheets

SILICATE DEFOAMING COMPOSITION AND METHODS

This application is a division of application Ser. No. 08/354,020 filed Dec. 6, 1994 now U.S Pat. No. 5,575,950.

FIELD OF THE INVENTION

This invention relates to defoaming compositions and more particularly relates to aluminum treated silicate compositions and their use as defoaming agents in paper coatings and textile processes, and other manufacturing procedures.

BACKGROUND OF THE INVENTION

The prior art is well aware of defoaming compositions which are used in many types of manufacturing processes to break bubbles and defoam aqueous systems. Major industries which require the use of defoamers are in the manufacture of paper, the manufacture of paints and coatings, and the manufacture of textiles. A defoamer is necessary in such industries to reduce the amount of foam and permit the manufacturing process to operate at full efficiency. Water based defoamers are oil-in water emulsions, usually containing about 75% to 90% water, and are dispersible in water. See Wamsley et al, Pulp & Paper in Canada, 95:5 (1994), p. 47–50.

Foam in paper mills and pulp mills may interfere with many processes and can affect the efficiency of refiners, pumps, screens, centrifugal cleaners, deinking plants and water removal equipment. Foam will adversely affect final sheet formation, porosity, opacity, printability, smoothness, and plybond strength. Excessive foaming leads to loss of fibers and raw materials. Further, the drainage rate of a sheet on the wire can be affected by the presence of trapped air in a wet web. When a sheet or mat has a large number of trapped bubbles, the drainage rate is slowed because the water passing through the sheet or mat must also pass between the bubbles.

Precipitated silicas are known to be used in formulation of anti-foaming agents, particularly in pulp and paper applications. Such precipitated silica formulations generally comprise an oil dispersion of silica particles which have been surface treated to render them hydrophobic. As pointed out in the publication by Patterson, Colloids and Surfaces A: Physico, Chemical and Engineering Aspects 74 (1993) pps. 115–126, the hydrophobic silica particles are the active bubble breakers and the oil serves as the means of carrying these active particles to the bubbles in the form of fine droplets which are insoluble in the aqueous foam. These oil dispersions may also be emulsified with water and surfactants and often contain other proprietary ingredients designed to enhance stability and activity. It is pointed out in this publication that silica may be made hydrophobic by various methods including dispersion in a silicone oil and heating the resultant mixture. The heating step causes the silicone to react with the silica surface and render it hydrophobic. The publication notes that if the silica is merely dispersed gently in the silicone without heating, the silica remains hydrophilic and does not contribute to anti-foaming activity.

Various proposals are found in the literature to modify precipitated silicas to improve properties for various uses including defoaming agents. For example, in U.S. Pat. No. 4,224,295, a finely divided silicic acid is prepared by spray drying in the presence of a base or basic reacting substance to destroy unwanted acidity and produce a composition useful as an additive in defoaming agents.

U.S. Pat. No. 3,993,497 discloses the production of precipitated silicas by addition of sulfuric acid and aluminum sulfate to sodium silicate, this product being a reinforcing agent or flatting agent in paints and varnishes, a carrier for flow condition, or liquid drying agent. U.S. Pat. No. 4,036,663 discloses a finely divided pigment produced by dry blending mixtures of sodium aluminum silicate and aluminum sulfate, such pigments being useful in paper, rubber, paint and adhesives. U.S. Pat. No. 4,038,098 discloses a method for producing precipitated silica abrasive compositions for dentifrice use wherein an aluminum sulfate adduct is added to the composition to control refractive index. U.S. Pat. No. 5,168,082 discloses a ceramic composition comprising an additive of a functionalized colloidal silica sol prepared by mixing alumina and colloidal silica as a dispersion and then spray drying.

The present invention provides a new and improved defoaming agents based on precipitated silica and silicate compositions.

SUMMARY OF THE INVENTION

It is accordingly one object of the present invention to provide a novel defoaming composition.

A further object of the invention is to provide aluminum treated silicate compositions which have improved properties for use in defoaming applications.

A still further object of the invention is to provide defoaming formulations comprising aluminum-treated silicate compositions in combination with a carrier.

A still further object of the invention is to provide a method for defoaming aqueous compositions such as those used in the manufacturing processes for paper, paint coatings and textiles by addition of a modified silicate to the aqueous composition.

Other objects and advantages of the present invention will become apparent as the description thereof proceeds.

In satisfaction of the foregoing objects and advantages, the present invention provides a defoaming composition comprising:

a) aluminum treated silicate particles; and b) a defoaming carrier.

In a further embodiment, the present invention provides a silicate composition having defoaming properties comprising a sodium magnesium aluminosilicate, which sodium magnesium aluminosilicate has been treated with aluminum, and then made hydrophobic.

In a still further embodiment, the present invention provides a method for defoaming aqueous compositions subject to foaming, which comprises adding to said aqueous compositions a defoaming effective amount of a defoaming formulation comprising an aluminum-treated silicate particle and a defoaming carrier.

In a still further embodiment of the invention, there are provided method for preparation of the defoaming formulations of the invention.

BRIEF DESCRIPTION OF THE DRAWINGS

Reference is now made the drawings accompanying the application wherein.

DESCRIPTION OF THE INVENTION

Figure 1:
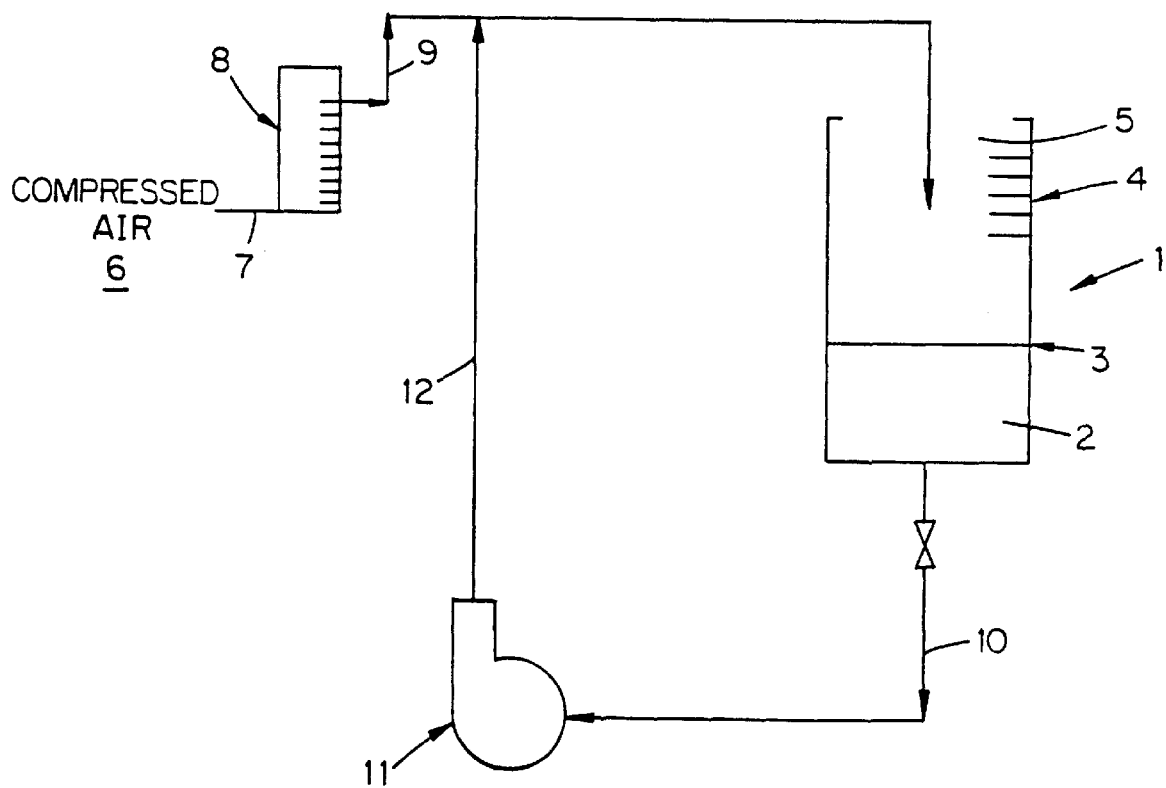
FIG. 1 is a flow sheet for an apparatus and method for testing compositions to determine anti-foaming characteristics.

The present invention is directed to a new and improved defoaming formulation based on modified silicate compositions. The silicates used in the defoaming formulations of the present invention are silicates which have been treated with aluminum under conditions of high heat, especially by treatment in a spray dryer. The defoaming formulations of the present invention comprise a hydrophobic aluminum treated silicate component and a carrier for said silicate. In a still more preferred embodiment, the carrier comprises a silicone fluid contained in an oil and water dispersion. In a more preferred embodiment, the silicate component is an alum treated sodium magnesium aluminosilicate pigment.

In one embodiment of the invention, it has been discovered that silicates which have been treated with aluminum have improved properties as defoaming agents, especially in dispersion type defoaming compositions. The silicates may comprise any of the various silicates known to the art as defoaming agents, including alkaline earth silicates such as calcium silicate. Commercial sodium aluminosilicates and precipitated silicon dioxides, both available from J. M. Huber Corporation, may be used as the base silicate. In a preferred embodiment, however, the silicate defoaming agent is based on the sodium magnesium aluminosilicate pigments described in U.S. Pat. Nos. 3,798,046, 3,909,286 and 3,915,734 and RE 30568. The entire disclosures of these patents are incorporated herein by reference for the disclosure of the sodium magnesium aluminosilicate pigments described therein and their method of preparation.

To form the defoaming silicates of the present invention, the silicate or sodium magnesium aluminosilicate as discussed above is reacted with a source of aluminum under conditions to provide said silicates. In a most preferred aspect, the silicates will have a pH of less than 7.5 and preferably a pH of 1.0 to 7.0, more preferably a pH of 2.0 to 6.0. In a preferred embodiment the silica or silicate is reacted with aluminum sulfate, commonly known as alum, to produce the aluminum-treated silicate. Alum provides both the required aluminum source and acidity. In the preferred embodiment, the aluminum sulfate or alum is reacted with the silicate under conditions of high heat such as in a spray drier. In the most preferred embodiment, a slurry of the precipitated silicate is contacted with an aqueous alum solution and injected into a spray dryer under conditions of high heat. The temperature in the spray dryer will range from about 1000°–1100° F. (540°–593° C.). Typically, the precipitated silicate is treated with the aluminum sulfate or other aluminum source using sufficient amounts of the aluminum sulfate or other source to provide about 0.1–2.5 wt. % of aluminum in the precipitated silicate.

It should be understood that the use of alum or aluminum sulfate represents a highly preferred embodiment of the invention. However, other sources of aluminum such as sodium aluminate, and as may be known by those skilled in the art, could also be used.

In a most preferred embodiment for treating the silicate, a pumpable slurry of a silicate having a solids content in the range of 20–30 wt. %, preferably about 24 wt. %, is injected into a spray dryer maintained at a temperature in the range of 1100° F. (593° C.). Just prior to injection into the spray dryer, the silicate slurry is mixed with a sufficient amount of an aluminum sulfate solution, preferably at a 3.5 pounds per gallon concentration, to provide the treatment level of about 0.1 to 2.5 wt. % of aluminum, or preferably about 0.3–1.2 wt. % of aluminum. The aluminum treated silicate is then recovered from the spray dryer.

This aluminum treated silicate is hydrophilic. For use as a defoaming agent, it is necessary that the hydrophilic silicate be converted to hydrophobic silicate particles as discussed by Patterson, Colloids and Services A: Physico, Chemical and Engineering Aspects. 74 (1993) pps. 115–126. As pointed out by Patterson, it is known that hydrophobic silicate particles are the active bubble breakers so that conversion from the hydrophilic to hydrophobic character is essential.

In one aspect of the invention, the hydrophilic silicate produced by the aluminum treatment can be rendered hydrophobic by a surface treatment with a silicone fluid by methods known to the art and as described by Patterson. Such silicone fluids preferably include polydimethyl siloxane, also known as silicone oil. The hydrophobic silicate is then formed into a defoaming formulation comprising the hydrophobic aluminum treated silicate and a carrier, the carrier comprising the silicone fluid, oil, water, or combinations thereof.

Two major methods are known in the art to produce the hydrophobic formulation. These methods are the "Dry Roast" method and the "In-Situ" method. In both methods, the silicate is treated with silicone oil in amounts of about 10 to 40 wt. %. In the "Dry Roast" method, the silicate as a dry powder is treated or impregnated with the silicone oil by heating, for example, at about 205° C. for about 4 hours to coat the silicate with the silicone fluid. The resulting coated silicate is then dispersed in a carrier such as mineral oil, edible oil, silicone oil, water, or mixtures thereof to form the defoaming agent.

In the second method, the "In-Situ" method, the silicate dry product, the carrier and silicone fluid are mixed and heated at about 105° C. in the presence of a catalyst such as ammonium carbonate to form a homogenous mixture and convert the silicate to hydrophobic particles and form the defoaming formulation in a single step. Both the Dry Roast method and the In-Situ method are fully described by Patterson, supra. The disclosure of this publication also being incorporated herein by reference.

A preferred defoaming formulation according to the invention is as follows:

| | |
|---|---|
| a) Aluminum-treated hydrophobized silicate | 1–25 wt. % |
| b) Carrier | 25–99 wt. % |

An especially preferred formulation is as follows:

| | |
|---|---|
| a) Aluminum-treated silicate | 5–20 wt. % |
| b) Silicone Oil | 0.3–25 wt. % |
| c) Mineral Oil | 40–95 wt. % |
| d) Water | 40–95 wt. % |

The defoaming formulation may also contain other known components in addition to the silicate primary defoaming agent, such as secondary defoaming agents, carriers, emulsifiers, coupling or stabilizing agents, or the like as described by Kirk-Othmer: Encyclopedia of Chemical Technology, Vol. 7, Third Edition, pp. 430–438, the disclosure of which is incorporated herein by reference.

Secondary antifoam agents function by providing a synergistic effect with the primary antifoam agent. The secondary antifoam agent usually modify the surface effect of the primary antifoam agent by modifying the spreading, solubility, or crystalinity of that material with regard to the carrier and the foaming media. Some secondary antifoam agents are fatty alcohols, fatty esters, silicones, and certain oil insoluble polymers. Carriers, or vehicles, comprise the bulk of the defoamer formulation and are usually hydrocarbon oils or water, although other products such as fatty alcohols, solvents, or fatty esters are sometimes used. The carrier should serve to introduce the main and secondary antifoam agent into the system. Emulsifiers function by introducing the main components (primary antifoam agent, secondary antifoam agent, and carrier) into the system. Spreading effectiveness is one of the most important measurable characteristics of a defoamer no matter what the application. Examples of emulsifying or spreading agents are esters, ethoxylated products, sorbitan esters, silicones, and alcohol sulfates.

Coupling or stabilizing agents are additives that contribute to defoamer stability or shelf life, such as cosolvents for the primary or secondary antifoam agents and the carrier. In a water-based defoamer the stabilizing agent may be a preservative added to prevent bacterial spoilage in the drum or other shipping container. Examples of coupling agents are red oil (oleic acid), hexylene glycol, fatty alcohols, naphthalene sulfonates, butyl alcohol, and formaldehyde.

The defoaming formulation of the present invention may be used in any aqueous system in which defoaming agents are currently used. In a preferred embodiment, the defoaming composition of the present invention is used in paper plants to defoam Black Liquor, a stream well known to paper art. The Black Liquor is formed as a result of caustic extraction of pulp from wood with a high pH caustic solution which is subject to foaming. The formulations of the present invention are effective defoaming agents for such streams.

The following examples are presented to illustrate the invention, but the invention is not to be limited thereto. In the examples, parts are by weight unless otherwise indicated.

EXAMPLE 1

Test Procedures

In this example, controlled experiments were carried out to determine the defoaming effectiveness of the compositions of the present invention in comparison with untreated products and commercial products. In these experiments, sodium magnesium aluminosilicates, sodium aluminosilicates, calcium silicates and precipitated silicates or silicon dioxide, were compared. Sodium magnesium aluminosilicates were prepared using the Dry Roast method. Sodium aluminosilicates and silicon dioxide were prepared using the In-Situ method. Calcium silicates were prepared using both methods.

Test Method

The comparisons were carried out using a defoamer apparatus as described hereinbelow.

The defoamer test apparatus used is commonly referred to as an apparatus for suppression and knock down. Apparatus of this type are available commercially, for example, from SEN, Inc. of Portage, Mich. The test apparatus used in the comparisons of this invention is shown schematically in the accompanying FIG. 1. The test apparatus was used with Black Liquor obtained from a paper processing plant and using compressed air to cause foaming. The apparatus is shown in FIG. 1 where reference numeral 1 is a test cell containing black liquor 2 to a height level of 15 cm indicated at 3. The foam test cell is provided with graduated foam height measurements as shown at 4, wherein 5 indicates a foam height of 30 cm. Compressed air is introduced from source 6 through line 7 through pressure control 8 and then by line 9 into the foam test cell to cause foaming of the Black Liquor. The compressed air is introduced at the rate of 200 standard cubic centimeters per minute. The Black Liquor is continuously recirculated through line 10 by pump 11 and line 12 at the rate of 5 liters per minute. The level of the Black Liquor at rest in the foam cell is 15 cm. The foam height at the end of a suppression test is 30 cm as indicated at 5. The defoaming agent is added in the indicated amounts using a conventional syringe.

In preparation for the testing, a pretest procedure of the foam cell is carried out as follows:

PRE-TEST PROCEDURE FOR FOAM CELL

1. Turn pump on and drain foam cell, flushing with hot tap water.
2. Fill 800 ml plastic beaker with Black Liquor and pour into foam cell to the bottom of the yellow line (15 cm).
3. Turn pump on.
4. Load 1 cc syringe with first defoamer to be used and attach it to needle on foam cell.
5. As foam begins to rise, inject defoamer (this is will, at the same time, flush the needle and load the needle for testing).
6. Stop pump.
7. Carefully remove syringe from needle.
8. Drain foam cell.
9. Rinse inside foam cell and the area around needle 3 or 4 times with hot tap water until water becomes clear.
10. Completely drain foam cell.
11. Foam cell is now prepared to run test.

The test procedure for the foam cell is as follows:

TEST PROCEDURE FOR FOAM CELL

1.* Load 1 cc syringe with defoamer
2. Heat Black Liquor to 180° F. in microwave (Use temp. control and set to 180°)
3. Remove heated Black Liquor from microwave stirring it for 5 seconds.
4. Pour into foam cell to the base of the yellow line (15 cm).
5. Attach syringe to foam cell needle.
6. Start stop watch and pump at the same time.
7. Record No. of seconds to reach (17 cm).
8. As soon as foam reaches 17 cm start "second" stop watch and inject defoamer at the same time.
9. Record foam height every 30 seconds.
10. Continue until foam reaches 30 cm.
11. When test is complete, remove syringe and discharge second syringe filled with next defoamer into foam cell needle, in order to flush needle.
12. Repeat steps (1) thru (11) for next sample

* Grams defoamer used is determined by time v. foam height. Same weight used for all samples tested.

EXAMPLE 2

Figure 2:
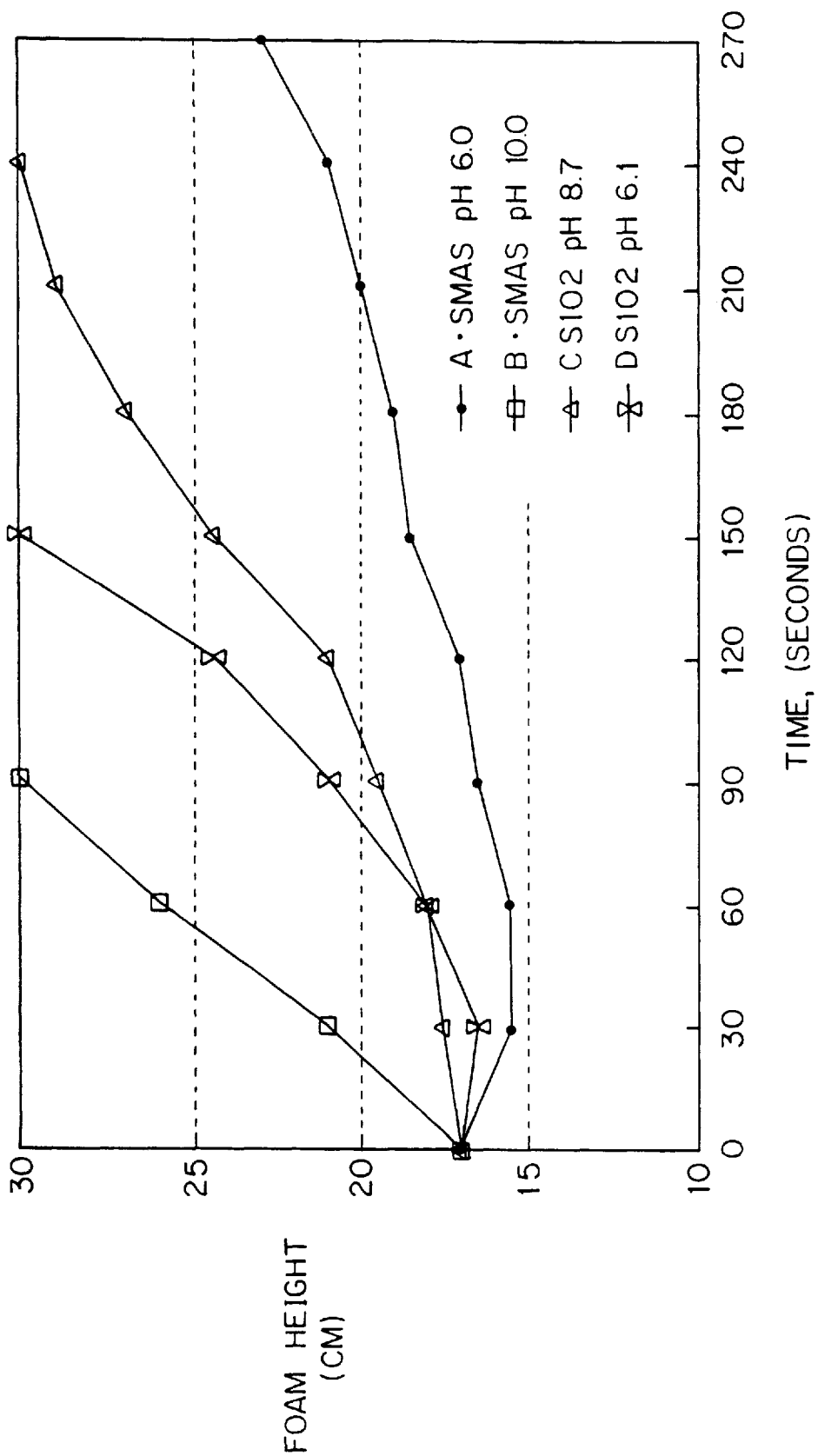
FIG. 2 is a graph showing comparative defoaming tests in a foam cell test.

In this Example, comparisons are made as seen in the graph of FIG. 2, using the apparatus and test procedure of Example 1, between commercial untreated sodium magnesium aluminosilicate (Sample B—pH 10.0) with a sodium magnesium aluminosilicate which had been treated with aluminum, Sample A. This graph also shows a comparison of untreated silicon dioxide, Sample D, and commercially available caustic treated silicon dioxide, Sample C.

As may be noted from the graph, the formulation which had been treated with aluminum sulfate and thus contained a controlled amount of aluminum exhibited substantially increased suppression time as measured by foam height, as compared to the controls.

EXAMPLE 3

Comparative Tests

A. Sodium Magnesium Aluminosilicates

Using the above test procedure, the following controlled experiments were carried out comparing formulations of sodium magnesium aluminosilicates formed into defoaming formulations by the Dry Roast method by treatment with 12 wt. % of silicone oil. In the following formulations, four separate sodium magnesium aluminosilicates were compared. The samples indicated as SMAS2 and SMAS4 are samples of two different sodium magnesium aluminosilicates which have been treated with alum as described above so as to contain 0.5 wt. % aluminum and 0.8 wt. % aluminum respectfully. These treatments were carried out as described above in a spray dryer. The samples identified as SMAS 1 and SMAS 3 are untreated controls of SMAS 2 and SMAS4, respectively.

Set forth in the following Table are details of these samples.

| Sodium Magnesium Aluminosilicate | | | | |
|---|---|---|---|---|
| Sample Type | Suppression Time (sec) | % Al added | % Silicone Oil* | Method |
| SMAS 1 | 90 | 0 | 12 | Dry Roast |
| SMAS 2 | 600 | 0.5 | 12 | Dry Roast |
| SMAS 3 | 30 | 0 | 12 | Dry Roast |
| SMAS 4 | 570 | 0.8 | 12 | Dry Roast |

*Silicone oil level determined experimentally to achieve optimum performance for particular silica/silicate.

The above formulations were subjected to the suppression and knock down test described in Example 1. The suppression time in seconds was noted as shown in the second column. As may be noted from the Table, samples 2 and 4, samples of the invention, showed suppression times of 600 and 570 seconds, respectively, compared to 90 and 30 seconds, respectively, for the control experiments thereby showing the improved results obtained by the aluminum treatment. As noted above in describing the test procedure, the suppression time in seconds is the time required for the foam to rise from 15 cm height to a 30 cm height in the foaming test. The longer the time, the more effective the defoaming agent.

B. Sodium Aluminosilicates

The following sodium aluminosilicate comparisons were carried out. The In-Situ method was used for these experiments to form the defoaming formulation and convert to a hydrophobic silicate in the defoaming formulation. In this method, the formulations consisted of 100.0 grams of mineral oil, 5.0 grams of the sodium aluminosilicate, 0.5 grams ammonium carbonate catalyst, and 1.3 grams of a silicone fluid sold commercially by Dow-Corning as Q2-3253. The mineral oil was weighed into a 500 ml flask, the silicate added and allowed to "wet out". This mixture was then placed in an ultrasonic bath for five minutes, and then placed on a hot plate with stirring and the ammonium carbonate added. While mixing, the silicone fluid was then added. This mixture was then heated to 80° C. (176° F.) with stirring. The temperature was maintained until the foaming slowed. The temperature was then increased to 105° C. (221° F.) while stirring and temperature maintained for two hours to produce the defoaming composition.

Defoaming compositions of this type were produced from sodium aluminosilicate to which no aluminum had been added (SAS1) and also produced with a sodium aluminosilicate which had been treated with alum so as to contain 0.3% aluminum (SAS 2). In the following Table, the suppression times for these two samples are indicated. The suppression time for the untreated sodium aluminosilicate was 100 seconds whereas the suppression time for the sodium aluminosilicate which had been treated with aluminum was 240 seconds. This shows a significant increase in defoaming characteristics of the aluminum-treated sodium aluminosilicate. The Table is as follows:

| Sodium Aluminosilicate | | | | |
|---|---|---|---|---|
| Sample Type | Suppression Time (sec) | % Al added | % Silicone Oil* | Method |
| SAS 1 | 100 | 0 | 26 | In-Situ |
| SAS 2 | 240 | 0.3 | 26 | In-Situ |

*Silicone oil level determined experimentally to achieve optimum performance for particular silica/silicate.

C. Precipitated Silicon Dioxide

In a further experiment, comparisons were made using formulations prepared by the In-Situ method using precipitated silicon dioxides. These precipitated silicon dioxides are commercially available precipitated silicon dioxides produced by acidulation of a sodium silicate solution with sulfuric acid. These silicates are available commercially from the J. M. Huber Corporation. As noted in the following Table, silica 1 is untreated, whereas silica 2 is silica 1 which has been treated with 0.6% aluminum. Silica 3 is another untreated control silica whereas silica 4 is silica 3 which has been treated with 1.2% aluminum.

This Table is as follows:

| Silicon Dioxide | | | | |
|---|---|---|---|---|
| Sample Type | Suppression Time (sec) | % Al added | % Silicone Oil* | Method |
| Silica 1 | 360 | 0 | 28 | In-Situ |
| Silica 2 | 630 | 0.6 | 28 | In-Situ |
| Silica 3 | 90 | 0 | 26 | In-Situ |
| Silica 4 | 120 | 1.2 | 26 | In-Situ |

*Silicone oil level determined experimentally to achieve optimum performance for particular silica/silicate.

As may be noted in the above table, the suppression time for silica 2, as compared to silica 1, is 630 seconds as compared to 360 seconds, a significant increase in defoaming characteristics. Silica 4 shows a suppression time of 120 seconds as compared to 90 seconds for silica 3, also showing significant defoaming characteristics.

As may be noted from the graph, the formulation which had been treated with aluminum sulfate and thus contained a controlled amount of aluminum exhibited substantially increased suppression time as measured by foam height, as compared to the controls.

EXAMPLE 4

In this example, aluminum-treated and untreated calcium silicates are compared as defoaming agents. The following table shows data on the performance of calcium silicate treated with alum used as a defoaming agent in both In-Situ and Dry Roast processes. The table shows the level of aluminum treatment.

| | Calcium Silicate | | | |
|---|---|---|---|---|
| Sample | Suppression Time (sec) | % Al added | % Silicone Oil | Method |
| Sample 1 | 270 | 0 | 26 | In-Situ |
| Sample 2 | 360 | 0.8 | 26 | In-Situ |
| Sample 3 | 180 | 0 | 12 | Dry Roast |
| Sample 4 | 240 | 0.4 | 12 | Dry Roast |
| Sample 5 | 600 | 0.8 | 12 | Dry Roast |

*Silicone oil level determined experimentally to achieve optimum performance for particular silicate.

As may be noted from the above table, the aluminum-treated calcium silicate samples showed improved defoaming characteristics as shown by the foam suppression time in seconds. The calcium silicate Sample 4 had a pH of 9.5 and Sample 5 had a pH of 9.1

The invention has been described herein with reference to certain preferred embodiments. However, obvious variations thereon will become apparent to those skilled in the art, the invention is not to be considered as limited to.

What is claimed is:

1. A method for defoaming aqueous compositions subject to foaming which comprises adding thereto to a defoamer composition comprising:

a) a hydrophobized aluminum treated silicate prepared by treating silicate particles with aluminum sulfate in an amount sufficient to provide an aluminum treatment level about 0.3–1.2 wt. % based on the silicate, and b) a defoaming carrier.

2. A method according to claim 1, wherein the composition subject to foaming is in a paper process, paint process, coating process or textile process.

3. A method according to claim 2, wherein the aqueous composition is Black Liquor used in paper manufacture.

4. A method according to claim 1, wherein the silicate in the defoaming formulation is selected from the group consisting of silicon dioxides, alkali metal magnesium aluminosilicates, sodium aluminosilicates, calcium silicates, and mixtures thereof.

5. A method according to claim 1, wherein the defoaming carrier is selected from the group consisting of a silicone fluid, a mineral oil, water, and combinations thereof.

6. A method according to claim 1, where said hydrophobized aluminum treated silicate is prepared by the Dry Roast method.

7. A method according to claim 1, wherein said hydrophobized aluminum treated silicate is prepared by the In-Situ method.

8. A method according to claim 1, wherein the silicate particles are treated with aluminum sulfate in a spray dryer.

9. A method according to claim 8, wherein an aqueous slurry of the silicate is contacted with aluminum sulfate and introduced into a spray dryer maintained at a temperature in the range of about 1000°–1100° F. and recovering the product therefrom.

* * * * *